United States Patent [19]

Miyoshi et al.

[11] Patent Number: 4,569,587

[45] Date of Patent: Feb. 11, 1986

[54] PAPER SUPPLY SYSTEM OF COPYING MACHINE AND A PAPER SUPPLY CASSETTE

[75] Inventors: Yoshitake Miyoshi, Ikoma; Ichirou Takahashi, Osaka; Takehiko Okada, Osaka; Haruo Yamamoto, Osaka, all of Japan

[73] Assignee: Mita Industrial Co., Ltd., Osaka, Japan

[21] Appl. No.: 589,935

[22] Filed: Mar. 14, 1984

[30] Foreign Application Priority Data

Apr. 12, 1983 [JP] Japan .................................. 58-65018

[51] Int. Cl.[4] .............................................. G03B 27/58

[52] U.S. Cl. .................................. 355/72; 355/3 SH; 355/14 SH

[58] Field of Search .................. 355/3 SH, 14 SH, 72, 355/75; 271/3, 1, 4, 9, 127

[56] References Cited

U.S. PATENT DOCUMENTS 4,227,800 10/1980 Nezu .................................... 355/72

4,279,504 7/1981 Brown et al. ......................... 355/72

*Primary Examiner*—Richard A. Wintercorn

*Attorney, Agent, or Firm*—Wenderoth, Lind & Ponack

[57] ABSTRACT

A copying machine paper supply enables various paper supply cassettes having different volumes to be easily accommodated in only one large space. Cassette holding members are formed at opposite sides of the space and receive guide portions formed on opposite sides of each paper supply cassette. The cassette thus is housed in the space and is supported at the opposite sides thereof only.

3 Claims, 9 Drawing Figures

PAPER SUPPLY SYSTEM OF COPYING MACHINE AND A PAPER SUPPLY CASSETTE

BACKGROUND OF THE INVENTION

1. Field of the Invention

The present invention relates to a copying machine paper supply system comprising a paper supply cassette provided with a plate for supporting copying papers and a pushing-up apparatus for pushing up the plate to urge the copying papers thereon upwardly, a space for housing the paper supply cassette therein and a cassette holding member installed in the space for enabling insertion and removal of the paper supply cassette, and to a paper supply cassette used in such a copying machine.

2. Description of the Prior Art

At present, copying machines using paper supply cassettes are popular. However, there are generally paper supply cassettes of small volume type housing about 250 pieces of copying paper therein and paper supply cassettes of large volume type housing about 500 pieces of copying paper therein. Copying paper sheets of B5 size and A4 size provided in JIS, which are used frequently, should be housed in a paper supply cassette of large capacity to reduce the number of cassette supply operations. On the contrary, copying paper sheets of B4 size and the like, which are large-sized and used at lower frequencies, should be housed in a paper supply cassette of smaller capacity, since such paper supply cassette otherwise would be relatively heavy, thereby resulting in the disadvantages of difficulty of handling and the possibility that the copying papers become deteriorated by moisture and the like. In addition, at present paper supply cassettes of small volume type housing about 250 pieces of copying paper and those of large volume type housing about 500 pieces of copying paper are used since copying papers are frequently packaged with 500 pieces as a unit.

"Single cassette type" copying machines, which accommodate only one paper supply cassette, and "plural cassette type" copying machines, which accommodate a plurality of paper supply cassettes, are on the market. However, in consideration of the above described present state of copying machines, "single cassette type" copying machines are constructed to house only a paper supply cassette of small volume type or only a paper supply cassette of large volume type. That is to say, a paper supply cassette housing 500 pieces of copying paper cannot be employed in "single cassette type" copying machines in which a paper supply cassette housing 250 pieces of copying paper is exclusively employed, and a paper supply cassette housing 250 pieces of copying paper cannot be employed in "single cassette type" copying machines in which a paper supply cassette housing 500 pieces of copying paper is exclusively employed. Although a "plural cassette type" copying machine is provided with a space for housing a paper supply cassette of small volume type therein and a space for housing a paper supply cassette of large volume type therein, such a machine has the disadvantage that only a paper supply cassette of small volume type can be positioned in the space for housing paper supply cassettes of small volume type, and only a paper supply cassette of large volume type can be positioned in the space for housing paper supply cassettes of large volume. In such arrangement, a cassette-holding member extends across substantially the entire width of the space for housing the paper supply cassette, and the bottom surface of the cassette is supported over the entire width thereof.

SUMMARY OF THE INVENTION

The present invention was developed by paying attention to the above described disadvantages incidental to copying machine of conventional structure. It is an object of the present invention to provide a novel copying machine paper supply apparatus and paper supply cassette which are easy to use, and wherein a paper supply cassette of small volume type housing 250 pieces of copying paper, a paper supply cassette of large volume type housing 500 pieces of copying paper, and further a paper supply cassette of super large volume type housing 750 or 1,000 pieces of copying paper can be inserted into only one space of a single size, by improving the cassette-holding members on the sides of the housing of the machine and the paper supply cassette.

BRIEF DESCRIPTION OF THE DRAWINGS

The drawings show preferred embodiments of a copying machine and a paper supply cassette for use therewith according to the present invention, in which.

DESCRIPTION OF THE PREFERRED EMBODIMENTS

Figure 1:
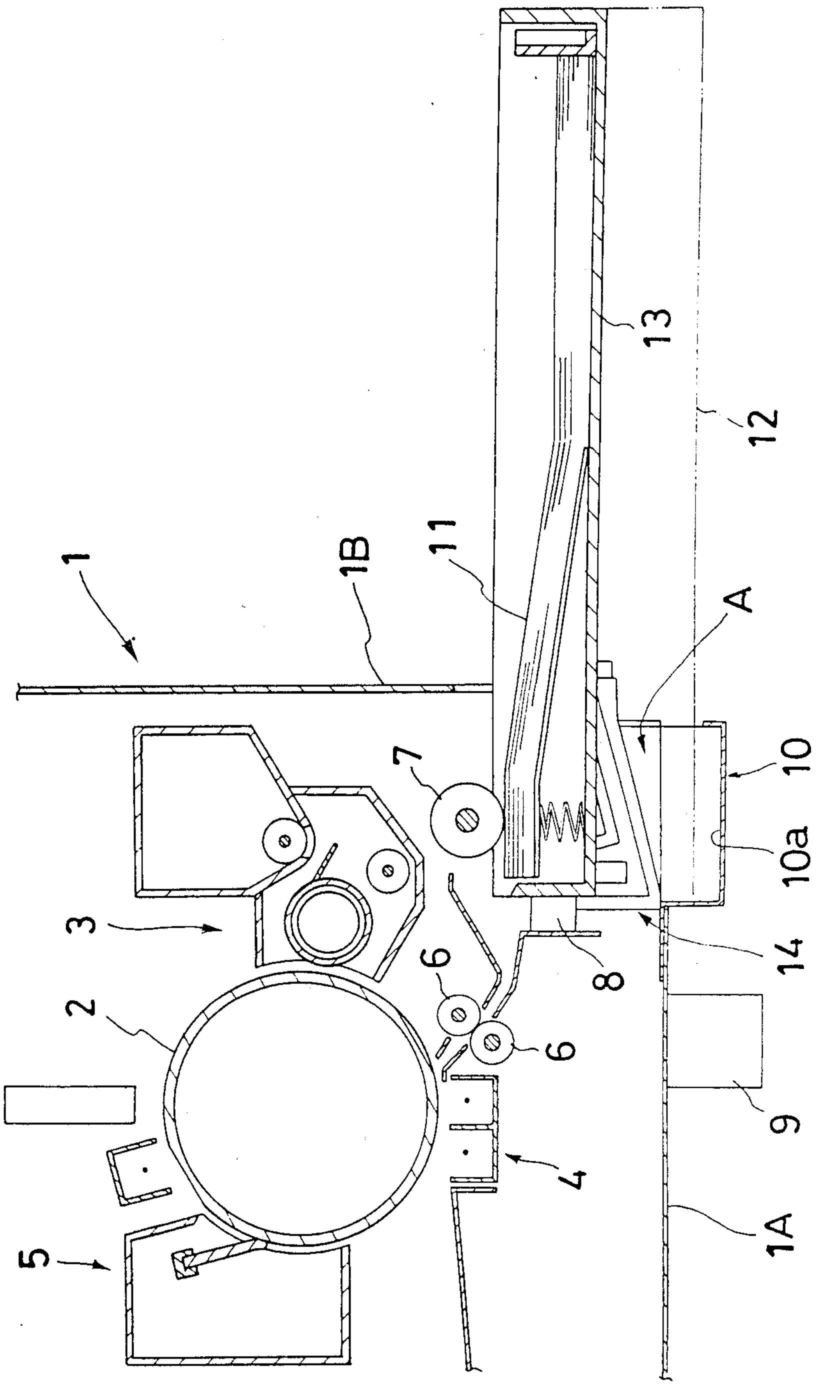
FIG. 1 is a partial, longitudinally sectioned front view showing the principal parts of a copying machine and a paper supply cassette for use therewith.

The preferred embodiments of the present invention will be described below with reference to the drawings. Referring now to FIG. 1, which is a sectional view showing the principal parts of a "single cassette type" copying machine, a housing 1 of the copying machine is provided with a photoreceptor 2, a developing mechanism 3, a transferring and separating mechanism 4, a cleaning mechanism 5, carrying rollers 6, a delivering roller 7, a paper supply cassette size detecting mechanism 8, etc., as in a conventional copying machine. In addition, housing 1 is provided at the bottom thereof with four leg portions 9 having the same structure as in the conventional copying machine, two leg portions 9 at the front side being fixed, while two leg portions 9 at the rear side being adjustable in height up and down. The four leg portions 9 are used for horizontally installing housing 1 of the copying machine. A designates a space for housing therein a paper supply cassette and is provided by removing a corner portion formed by a bottom plate 1A and a right side plate 1B of housing 1 and installing a box-like case 10 in the removed area of bottom plate 1A so that a bottom plate member 10*a* is positioned below bottom plate 1A. That is to say, a space formed beneath the bottom portion of housing 1 and defined by leg portions 9 is utilized to form an expanded space so that a paper supply cassette 12 of large volume type housing 500 or more pieces of copying paper 11 may be housed in the expanded space. FIG. 1 shows a copying machine in which a paper supply cassette 13 of small volume type housing 250 pieces of copying paper is inserted into the space A, and paper supply cassette 13 is held by a cassette-holding member 14 installed in space A.

Figure 2:
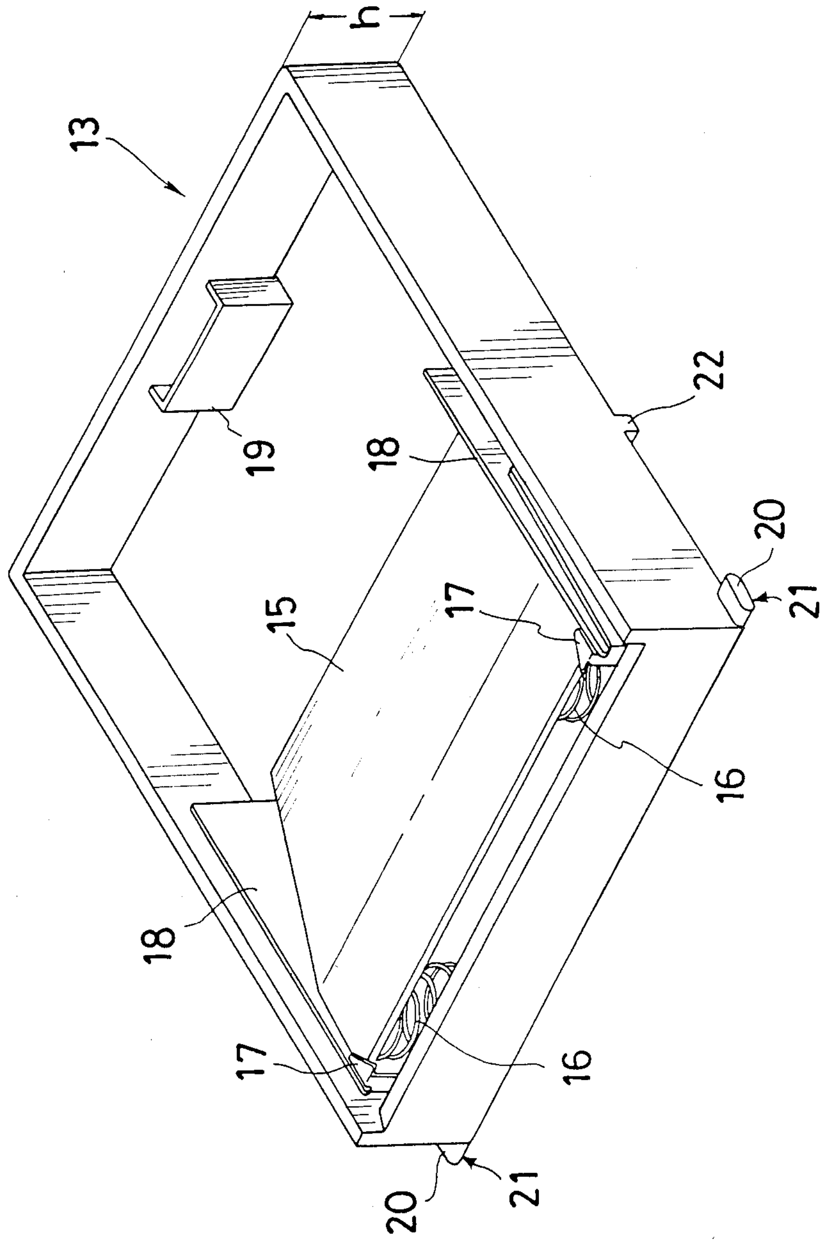
FIG. 2 is a perspective view showing a paper supply cassette of small volume type.
Figure 3:
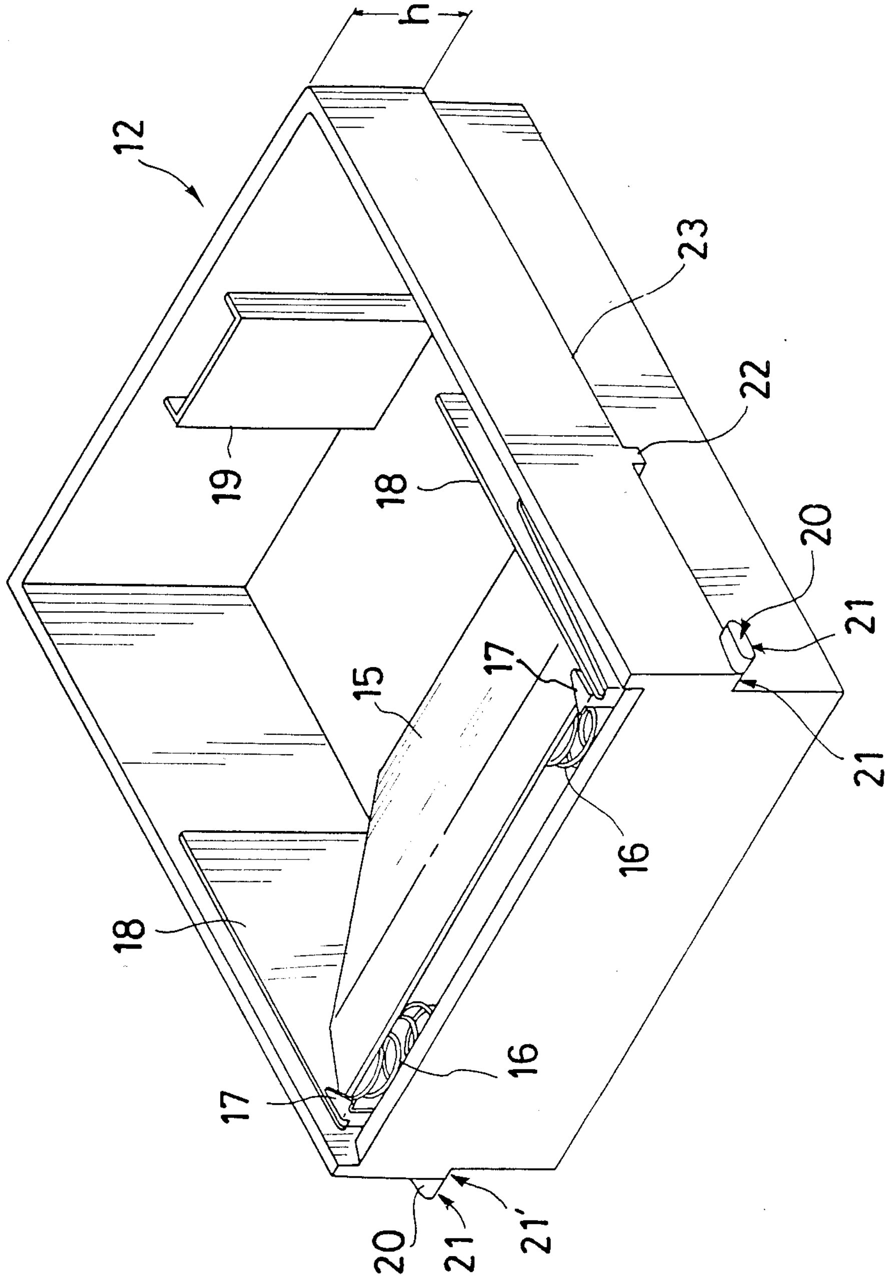
FIG. 3 is a perspective view showing a paper supply cassette of large volume type.

Referring now to FIG. 2, which is a perspective view of paper supply cassette 13 of small volume type housing 250 pieces of copying paper therein, and to FIG. 3 which is a perspective view of paper supply cassette 12 of large volume type housing 500 or more pieces of copying paper therein, and describing the same constituent members by the use of the same reference numerals, paper supply cassettes 12, 13 each are provided with plates 15 for supporting copying papers. A pushing-up apparatus 16 pushes upwardly plate 15 for urging upwardly copying papers thereon. Cogs or clicks 17 retain the copying papers. Plates 18 guide the side portions of the copying papers. A rear guide 19 guides the rear portions of the copying papers. These mechanisms are the same as conventional cassettes. Rear guide 19 for abutting the rear portions of the copying papers is constructed so as to be movable back and forth depending on the size of the copying papers 11. The paper supply cassettes according to the present invention differ from conventional cassettes in that each cassette 12, 13 is provided with guide portions 20 projecting from opposite sides thereof, the lower surface of each guide portion 20 forming a surface 21 for abutting a cassette-guiding and holding member 24, to be described below with reference to FIG. 4, and in that each cassette is provided with stoppers 22 on the lower surfaces of opposite sides thereof. Thus, paper supply cassette 13 of small volume type housing 250 pieces of copying paper therein is provided with guide portions 20 at the front end of the bottom portion of the opposite sides thereof, and with stoppers 22 on the bottom portions thereof at predetermined distances from guide portions 20. Paper supply cassette 12 of large volume type housing 500 or more pieces of copying paper therein is provided at each side thereof with an inwardly extending step 23, located at the same height h from the cassette top as the total height of the paper supply cassette 13 of small volume type. Guide portions 20 are located at the front end the opposite of sides directly above steps 23, similar to paper supply cassette 13 of small volume type, and stoppers 22 are located on the lower surfaces of steps 23 at the predetermined distances from guide portions 20.

Figure 4:
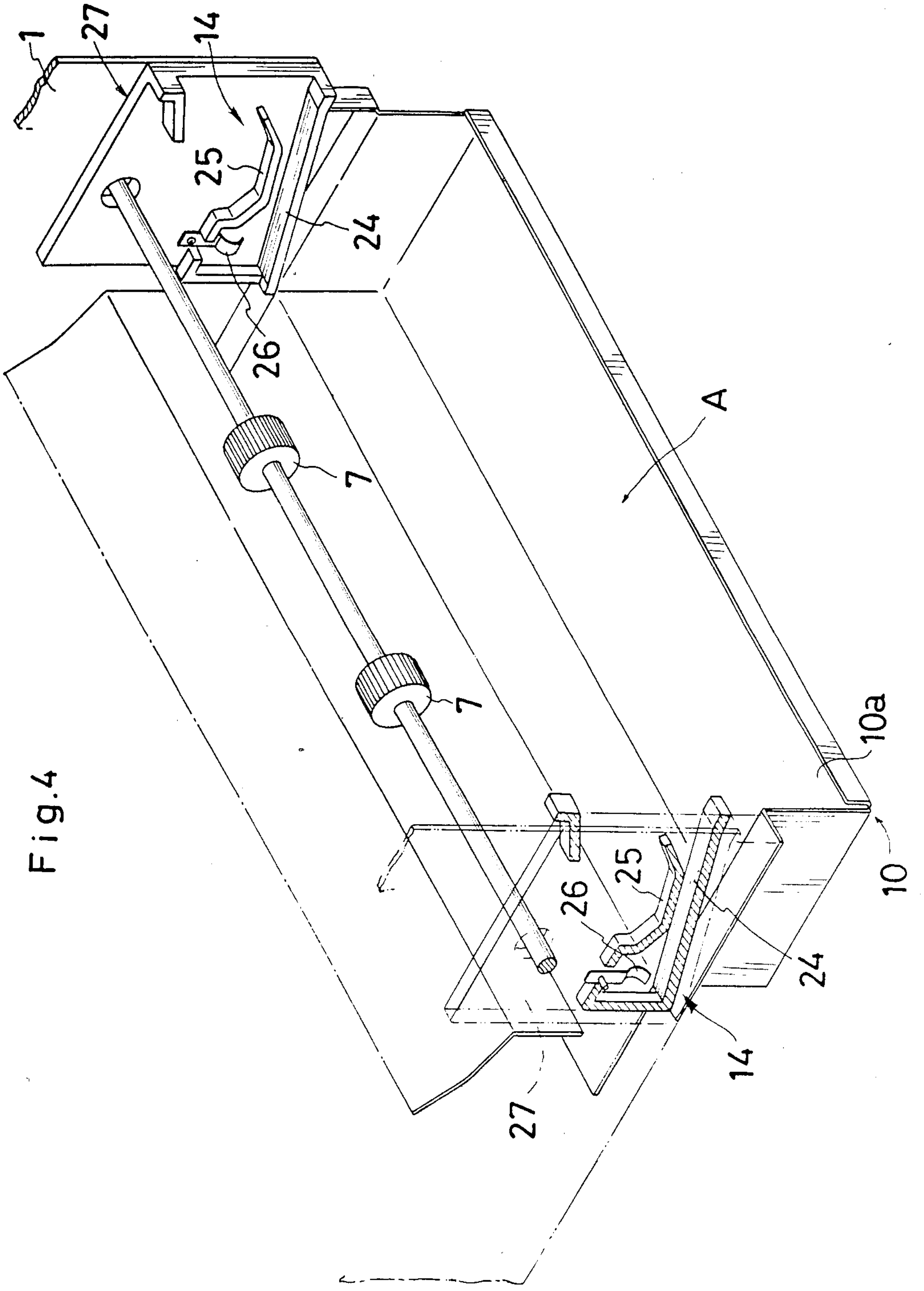
FIG. 4 is a partial perspective view showing details of a cassette-holding portion.

Referring now to FIG. 4 which is a perspective view of cassette-holding members 14 on opposite sides of housing 1, cassette-holding members 14 are formed integrally with respective plate members 27 positioned at opposite sides of space A. Cassette-holding portion 14 is formed of cassette-guiding and holding member 24 which has substantially an L-shaped configuration, guide members 25 installed above cassette-guiding and holding member 24 in face-to-face relation therewith, and an inwardly projecting flatspring 26 extending vertically within a horizontal space formed between cassette-guiding and holding member 24 and guide member 25.

Figure 5:
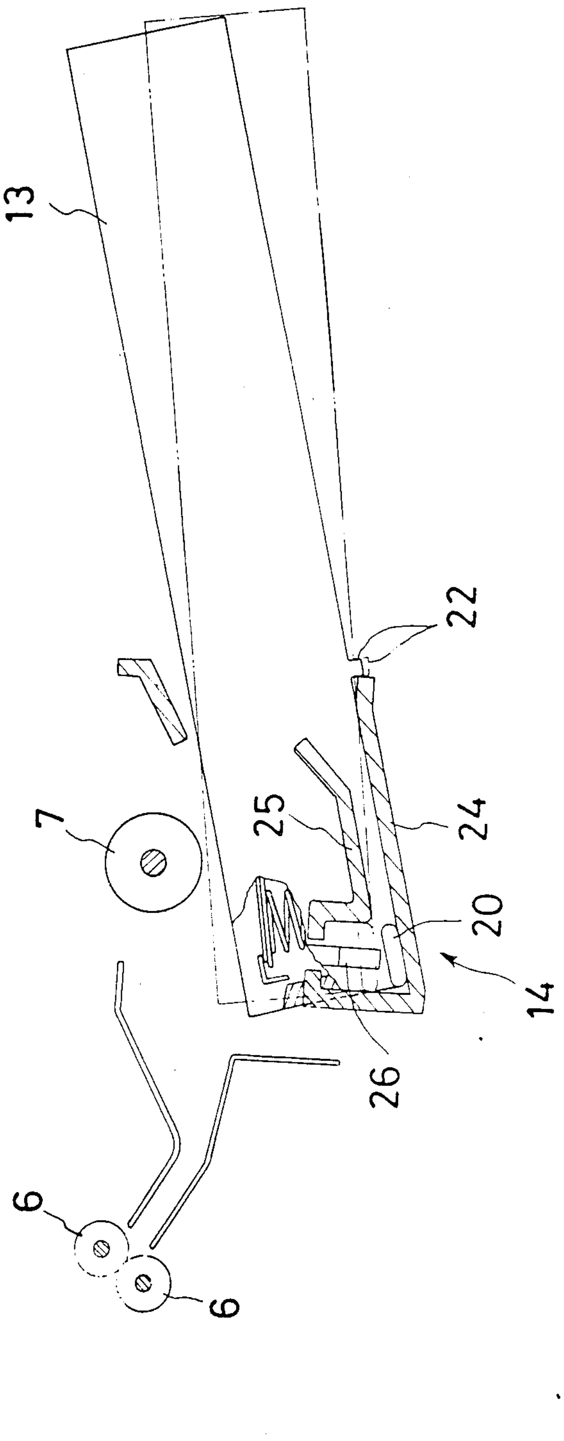
FIG. 5 is a longitudinally sectioned view of the principal parts of a copying machine and a paper supply cassette for use therewith, showing a paper supply cassette positioned in a receiving space therefor.
Figure 6:
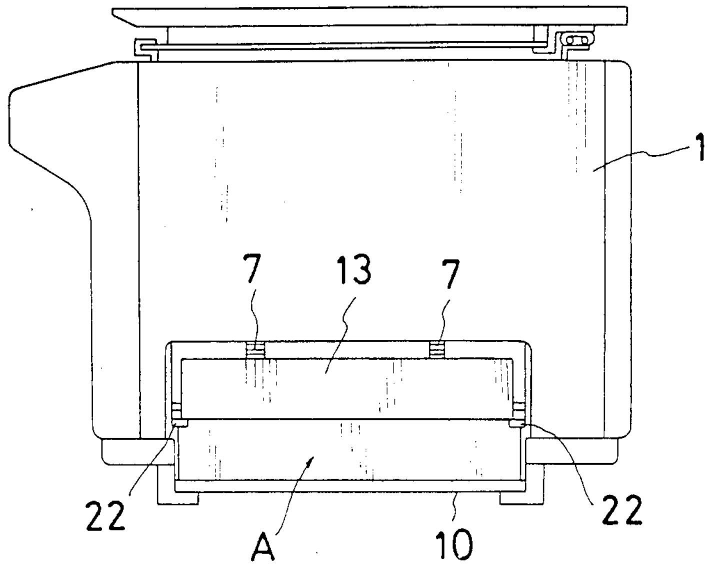
FIG. 6 is a side view of the entire copying machine showing a paper supply cassette of small volume type positioned in the receiving space therefor.
Figure 7:
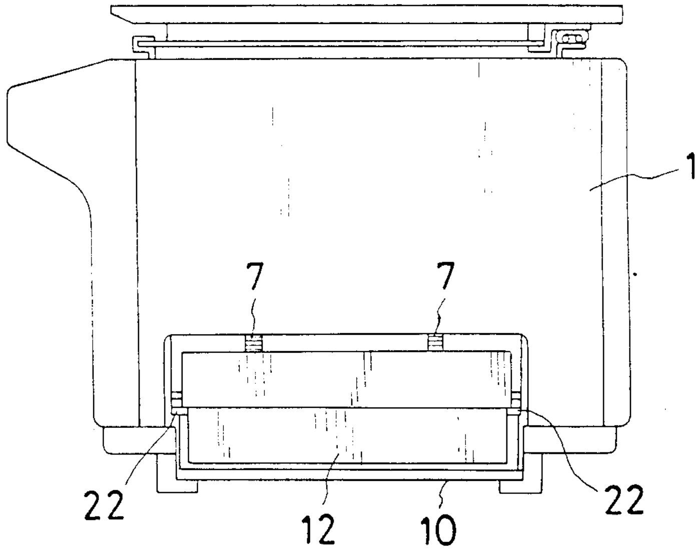
FIG. 7 is a side view of the entire copying machine showing a paper supply cassette of large volume type positioned in the receiving space therefor.

Since, cassette-holding members 14 are provided at opposite sides of space A, paper supply cassettes 12 or 13 are supported at opposite sides thereof only. Thus, it is necessary only to make space A sufficiently large to house either paper supply cassette 13 of small volume type or paper supply cassette 12 of large volume. That is to say, as shown in FIG. 5, paper supply cassette 13 of small volume type is housed in space A and held therein by inserting guide portions 20 between cassette-guiding and holding members 24 and guide members 25, thus causing paper supply cassette 13 to slide into channel-like spaces formed therebetween by said cassette-guiding and holding members 24 and said guide members 25. The rear end of paper supply cassette 13 then is pushed downwardly, as shown by phantom lines, thus deforming flat springs 26 by means of guide portions 20 and causing stoppers 22 to engage with the tops of cassette-guiding and holding members 24. FIG. 6 shows the entire copying machine as viewed from the paper supply cassette 13 side. Also, paper supply cassette 12 of large volume type can be inserted into and held in space A by the same operations as described above regarding paper supply cassette 13 of small volume type. Since, as shown in FIG. 3, steps 23 extend inwardly into opposite sides of paper supply cassette 12, paper supply cassette 12 itself is prevented from engaging with cassette-guiding and holding members 24 to obstruct the insertion thereof. The state of paper supply cassette 12 housed and held in space A is shown in FIG. 7.

Furthermore, as described above, space A is formed so as to project downwardly from bottom plate 1A of housing 1, and thus paper supply cassette 12 of large volume type can extend into and utilize the space beneath the bottom portion of housing 1 defined by leg portions 9 and can be housed therein without increasing the total volume of the copying machine.

Figure 8:
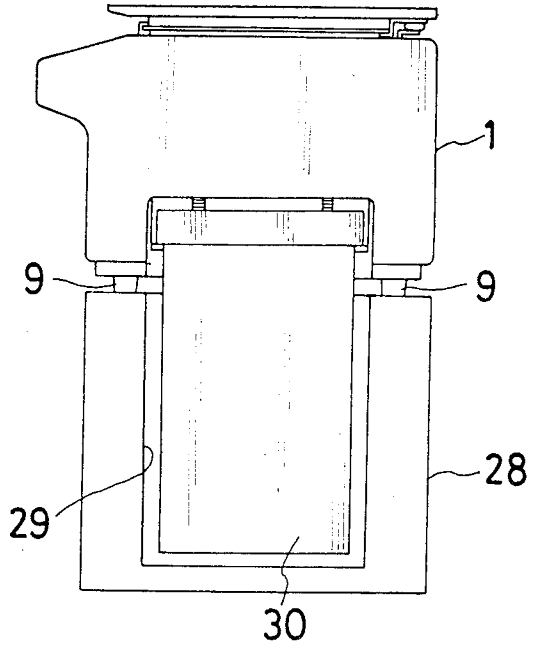
FIGS. 8 and 9 are elevation views showing other preferred embodiments of a copying machine in which a paper supply cassette of super large volume is positioned.
Figure 9:
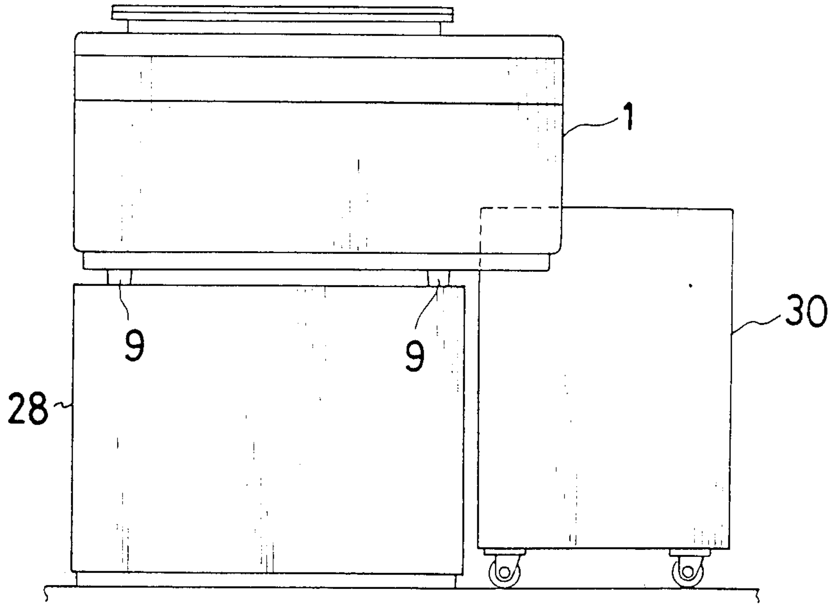

In addition, a paper supply cassette 30 of super large volume type can be supported without increasing the total volume of the copying machine in the same manner as described above by constructing the copying machine so that leg portions 9 are located on opposite sides of the cassette and forming a recess 29 for receiving the cassette within a stand 28 for supporting the copying machine, as shown in FIG. 8, or by constructing the copying machine so that leg portions 9 do not overlap the cassette and positioning the copying machine so that leg portions 9 are located near an end of stand 28 supporting the copying machine thereon, as shown in FIG. 9.

Although each paper supply cassette 12, 13 is provided with guide portions 20 projecting therefrom, and the lower surface of each guide portion 20 forms a surface 21 for contacting a cassette-guiding and holding member in the preferred embodiment of the present invention, the cassettes need not be provided with such guide portions 20, and the bottom portion of paper supply cassette 13 may form such surfaces as shown in FIG. 2, while the lower surfaces of steps 23 may form surfaces 21' for paper supply cassette 12 of large volume type as shown in FIG. 3. In addition, each paper supply cassette 12, 13 may be provided with grooves on the left and right sides thereof, while housing 1 may be provided with projections extending into such grooves. In short, any structure whereby the paper supply cassette 12, 13 is held at opposite sides thereof only can be employed, and various modifications are possible. Furthermore, although stoppers 22 are formed on the bottom portion or the lower surfaces of steps 23 of paper supply cassettes 12, 13 in the preferred embodiments of the present invention, varius modifications are possible. For example, stoppers 22 may be projected from the side portions of paper supply cassettes 12, 13. Paper supply cassettes 12, 13 of the present invention can be used, not only with a "single cassette type" copying machine, but also with a "plural cassette type" copying machine.

As is obvious from the above description, in the copying machine paper supply apparatus of the present invention, not only a paper supply cassette of small volume type housing 250 pieces of copying paper therein, but also a paper supply cassette of large volume type housing 500 or more pieces of copying paper therein can be housed and held in only one large space, since a cassette-holding member is constructed from a cassette-guiding and holding member holding a guide portion formed on the side of the paper supply cassette, and a paper supply cassette housed in the opposite sides thereof only. That is to say, the disadvantages described above incidental to the conventional copying machine can be eliminated, and the operation of the copying machine can be remarkably improved.

We claim:

1. In a copying machine paper supply system of the type including a housing having a bottom plate, a cassette receiving space within said housing above said bottom plate, a cassette containing a supply of copying paper sheets insertable into and removable from said space, and means for supporting said cassette within said space, the improvement wherein:

said space is expanded downwardly through said bottom plate and includes a portion beneath said bottom plate; and said supporting means comprises holding members at opposite sides of said space cooperating with guide members on opposite sides of said cassette and supporting said cassette only at said opposite sides thereof without contacting said cassette at portions thereof between said opposite sides;

whereby said cassette may be of a relatively small size to fit within said space above said bottom plate or of a relatively large size with a portion extending downwardly into said expanded space portion beneath said bottom plate.

2. The improvement claimed in claim 1, wherein said holding members define respective grooves, and said guide members comprise projections extending into said grooves.

3. The improvement claimed in claim 2, wherein said projections have respective lower surfaces guiding said cassette.

* * * * *